US009772668B1

(12) United States Patent
Soebroto et al.

(10) Patent No.: US 9,772,668 B1
(45) Date of Patent: Sep. 26, 2017

(54) POWER SHUTDOWN WITH ISOLATION LOGIC IN I/O POWER DOMAIN

(71) Applicant: Cadence Design Systems, Inc., San Jose, CA (US)

(72) Inventors: Tobing Soebroto, Cupertino, CA (US); James DeMaris, Fuquay-Varina, NC (US); Jose L. Medero, Apex, NC (US); Scott J. Tucker, Raleigh, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 702 days.

(21) Appl. No.: 13/629,424

(22) Filed: Sep. 27, 2012

(51) Int. Cl.
*G06F 1/00* (2006.01)
*G06F 1/32* (2006.01)
*G06F 1/26* (2006.01)

(52) U.S. Cl.
CPC .............. *G06F 1/3203* (2013.01); *G06F 1/26* (2013.01)

(58) Field of Classification Search
CPC ................................................... G06F 1/3203
USPC ........................................................ 713/300
See application file for complete search history.

(56) References Cited

U.S. PATENT DOCUMENTS

| 5,408,618 | A | 4/1995 | Aho et al. |
| 6,438,594 | B1 | 8/2002 | Bowman-Amuah |
| 6,779,004 | B1 | 8/2004 | Zintel |
| 6,954,790 | B2 | 10/2005 | Forslow |
| 6,978,314 | B2 | 12/2005 | Tarr |
| 6,981,041 | B2 | 12/2005 | Araujo et al. |
| 7,068,680 | B1 | 6/2006 | Kaltenmark et al. |
| 7,219,140 | B2 | 5/2007 | Marl et al. |
| 7,293,077 | B1 | 11/2007 | Teo et al. |
| 7,328,256 | B2 | 2/2008 | Taoyama et al. |
| 7,392,034 | B2 | 6/2008 | Westman et al. |

(Continued)

FOREIGN PATENT DOCUMENTS

| GB | 2341523 | 3/2000 |
| WO | WO 2011/133908 | 10/2011 |

OTHER PUBLICATIONS

Ellison, Craig (Mar. 29, 2011) "Iomega Home Media Network Hard Drive—Cloud Edition Reviewed" SmallCloudBuilder.com http://www.smallcloudbuilder.com/storage/reviews/311-iomega-home-media-network-hard-drive-cloud-edition-reviewed.

(Continued)

*Primary Examiner* — Robert Cassity
(74) *Attorney, Agent, or Firm* — Schwegman Lundberg & Woessner, P.A.

(57) ABSTRACT

A circuit for that includes isolation logic is disclosed. In one aspect, circuit comprises at least one input/output (I/O) cell, the I/O cell further including circuitry functions, isolation control logic, and a capability to receive power to the I/O cell from a power domain source. In a second aspect an integrated circuit comprises a physical layer (PHY) logic and at least one input/output (I/O) cell in communication with the PHY logic. The I/O cell capable of receiving power from a plurality of power domains. The I/O cell includes an isolation control logic and an I/O logic capable of receiving power from one power domain of a plurality of power domains, wherein the I/O logic and the isolation controller are arranged in communication through a level shifter for shifting power to maintain an active operation of the at least one I/O cell; wherein since the isolation control logic is within the I/O cell, only one active power domain of the plurality of power domains is required.

21 Claims, 3 Drawing Sheets

(56) References Cited

U.S. PATENT DOCUMENTS

| | | | |
|---|---|---|---|
| 7,408,882 B2 | 8/2008 | Abdo et al. | |
| 7,467,198 B2 | 12/2008 | Goodman et al. | |
| 7,487,230 B2 | 2/2009 | Gu et al. | |
| 7,558,846 B2 | 7/2009 | Gu et al. | |
| 7,562,393 B2 | 7/2009 | Buddhikot et al. | |
| 7,602,756 B2 | 10/2009 | Gu et al. | |
| 7,627,653 B2 | 12/2009 | Taoyama et al. | |
| 7,630,341 B2 | 12/2009 | Buddhikot et al. | |
| 7,636,764 B1 | 12/2009 | Fein et al. | |
| 7,640,340 B1 | 12/2009 | Stapp et al. | |
| 7,640,546 B2 | 12/2009 | Zarenin et al. | |
| 7,647,203 B1 | 1/2010 | Herz | |
| 7,676,690 B2 | 3/2010 | Bucher et al. | |
| 7,788,656 B2 | 8/2010 | Harper | |
| 7,810,148 B2 | 10/2010 | Ben-Shachar et al. | |
| 7,978,714 B2 | 7/2011 | Rao et al. | |
| 8,045,000 B2 | 10/2011 | Davidson et al. | |
| 8,069,217 B2 | 11/2011 | Lo et al. | |
| 8,300,056 B2 | 10/2012 | Nugent et al. | |
| 8,412,798 B1 | 4/2013 | Wang | |
| 2004/0223469 A1 | 11/2004 | Bahl et al. | |
| 2005/0091629 A1* | 4/2005 | Eisenstadt et al. | 716/13 |
| 2005/0174158 A1* | 8/2005 | Khan et al. | 327/333 |
| 2005/0286476 A1 | 12/2005 | Crosswy et al. | |
| 2006/0236175 A1* | 10/2006 | Usami et al. | 714/724 |
| 2006/0291434 A1 | 12/2006 | Gu et al. | |
| 2007/0165579 A1 | 7/2007 | Delibie et al. | |
| 2007/0294368 A1 | 12/2007 | Bomgaars et al. | |
| 2008/0016491 A1 | 1/2008 | Doepke | |
| 2008/0019333 A1 | 1/2008 | Kharia et al. | |
| 2008/0162698 A1 | 7/2008 | Hopen et al. | |
| 2008/0201751 A1 | 8/2008 | Ahmed et al. | |
| 2008/0246526 A1* | 10/2008 | Sahu | H03K 3/0375 327/198 |
| 2008/0301794 A1 | 12/2008 | Lee | |
| 2009/0019492 A1 | 1/2009 | Grasset | |
| 2009/0049321 A1* | 2/2009 | Balatsos et al. | 713/324 |
| 2009/0106394 A1 | 4/2009 | Lin et al. | |
| 2009/0303973 A1 | 12/2009 | Patil | |
| 2010/0036955 A1 | 2/2010 | Hopen et al. | |
| 2011/0107379 A1 | 5/2011 | Lajoie et al. | |
| 2011/0119646 A1* | 5/2011 | Murray et al. | 716/102 |
| 2011/0145418 A1 | 6/2011 | Pratt et al. | |
| 2011/0145821 A1 | 6/2011 | Philipson et al. | |
| 2011/0276812 A1* | 11/2011 | Lee | G06F 1/26 713/300 |
| 2012/0081382 A1 | 4/2012 | Lindahl et al. | |
| 2012/0084798 A1 | 4/2012 | Reeves et al. | |
| 2012/0307141 A1 | 12/2012 | Millet et al. | |
| 2012/0311329 A1 | 12/2012 | Medina et al. | |
| 2013/0024545 A1 | 1/2013 | Sheppard et al. | |
| 2013/0067550 A1 | 3/2013 | Chen et al. | |
| 2013/0231146 A1 | 9/2013 | Mathias et al. | |

OTHER PUBLICATIONS

Malik, Om (May 22, 2009) "How Pogoplug Works" gigaom.com http://gigaom.com/2009/05/22/how-pogoplug-works/.

MLDONKEY (Oct. 5, 2010) "WhatFirewallPortsToOpen" mldonkey.sourceforge.net http://mldonkey.sourceforge.net/WhatFirewallPortsToOpen.

McDowell, Guy "How Does a Router Work", Oct. 2009, http://www.makeuseof.com/tag/technology-explained-how-does-a-router-work/.

Liu, Rue "Iomega Home Media Hard Drive Cloud Edition Review—SlashGear", Jun. 2011, SlashGear, http://www.slashgear.com/iomega-home-media-hard-drive-cloud-edition-review-14156840/.

Use Yahoo Messenger for a Video or Audio Conference, Mar. 2005, http://education.ucf.edu/techfac/docs/videochattutorial.pdf.

* cited by examiner

POWER SHUTDOWN WITH ISOLATION LOGIC IN I/O POWER DOMAIN

FIELD OF THE INVENTION

The present invention relates generally to microprocessors, and more particularly, to power management associated for optimized system on chip (SoC) and integrated circuit (IC) design.

BACKGROUND OF THE INVENTION

In IC design, more and more functionality is being designed for incorporating more power processors into smaller integrated circuits, also known as systems on chip (SoC). These processors require complex design and manufacturing efforts, which are only escalating given present user and device demands for additional performance, function, and particularly mobility. Unfortunately, with increasing demands comes increased pressures on production cycle time and a premium demand for improved utilization of both the available footprint as well as the power management aspects of the processor or SoC.

In particular, there is an increasing demand for low-power designs given the increased demand for battery-based mobility needs. Similarly, designs are also being pressured to account and lower power losses due to current leakage issues. As a result, one approach to improve battery and power performance includes turning off the associated logic, requiring power management inside the SoC. Other earlier approaches have also included gating clocks in relation to inactive functions for more traditional circuits and then providing a "wake up" to the idled function. However, for SoCs, such traditional approaches are unsatisfactory, in part, as SoC power management is complex and needs to account for multiple power domains.

Power domains or power islands are power (or voltage-specific) areas of a specific voltage within a SoC. The power islands in a SoC provide for the independent voltage level and frequency operation within specific areas of the SoC footprint, usually providing power to those associated functions having that specific power need.

FIG. 1 depicts an example of an SoC 100. From FIG. 1, the SOC 100 has a portion 105 and power domains are designed within the circuitry of the SOC 100. Input/Output (I/O) cells are depicted at 120 though their particular orientation and arrangement may vary. Physical layer (PHY) logic 130 of the processor is in communication with a dynamic random access memory (DRAM) 150 via I/O buffer 180.

Examples of power domains include a core logic power domain, a protocol bridge power domain, an internal memory power domain, and an input/output (I/O) level. Examples of other domains may include a peripheral interface power domain, cache power domain, etc. In some SoCs there may further exist an "always on" power domain.

Each power domain typically has a representative voltage source associated with it, where, for example, the core logic power domain is 0.9 v and the I/O level power domain is 1.2 v. Further, power islands provide for the ability to isolate portions of the chip in terms of both voltage and frequency. In operation, a SoC can rely on the presence and operation of each of the designed power domains for normal operation of all of its associated functions.

A processor may deploy Power Shut-Off (PSO) techniques, such as power gating, to switch off power to parts of a chip when those certain blocks of that chip are not in use. For PSO, there may be power switches that are within the SoC control (i.e., chip shut-off) or there may be power switches which are external to the chip (i.e., off-chip shut-off). For on-chip shut-off, PSO approaches also typically require isolators (i.e., isolation cells) close or proximate to the PSO domain, but often the isolators are resident in an always-on domain or similar, as isolators require power. Similarly, for off-chip shut-off, PSO approaches also require isolators and additional circuit complexities which may also prove less reliable. Where a chip has multiple power domains, additional issues can arise concurrent with those above adding further concern.

FIG. 2 depicts a representative I/O cell 200 of an SoC having a plurality of isolation cells proximate to and external from the respective power domains. In FIG. 2, the I/O cell 200 has a core logic power domain at 212 and 232. In an embodiment, the core logic power domain is 0.9 v. Power from core logic power domain 212 is provided to the PHY logic 210 where at 214 the power may be disconnected when the device is in shut off or a reduced power mode or similar. Power provided to the PHY logic 210 may then be provided to the isolation control 220, in relation to that power provided directly to the isolation control 220 from a separate core power domain source 232. Core power domain source 232 provides power to the isolation control 220, the I/O logic 230 and the level shifter 240.

In operation, power to the isolation control 220 in the arrangement of FIG. 2 must also be maintained so as to ensure the logic is active (i.e., on) such that the signal on the I/O buffer 250 can be identified.

An I/O Level power domain 252 is provided to the functions associated with the I/O buffer 250 and the level shifter 240. The level shifter 240 provides functionality to translate voltages levels between the various power domains.

Unfortunately, these approaches each involve isolators external to the subject power domain, require multiple power domains to be operational for PSO, and may cause the I/O cell 200 to fall into an unknown state. This requires the use of three power domains so as to ensure the isolation logic is actively on so the signal on the I/O buffer can be identified.

What is desired is a method and circuit that addresses the above identified issues. The method and circuit should be simple, and easily implemented on existing designs. The present invention addresses such a need.

SUMMARY OF THE INVENTION

The present invention fulfills these needs and has been developed in response to the present state of the art, and in particular, in response to the problems and needs in the art that have not yet been fully solved by currently available technologies.

In one aspect, circuit comprises at least one input/output (I/O) cell, the I/O cell further including circuitry functions, isolation control logic, and a capability to receive power to the I/O cell from a power domain source.

In a second aspect an integrated circuit comprises a physical layer (PHY) logic and at least one input/output (I/O) cell in communication with the PHY logic. The I/O cell capable of receiving power from a plurality of power domains. The I/O cell includes an isolation control logic and an I/O logic capable of receiving power from one power domain of a plurality of power domains, wherein the I/O logic and the isolation controller are arranged in communication through a level shifter for shifting power to maintain an active operation of the at least one I/O cell; wherein since the isolation control logic is within the I/O cell, only one active power domain of the plurality of power domains is required.

Further embodiments, forms, objects, features, advantages, aspects, and benefits of the present application shall become apparent from the detailed description and drawings included herein.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
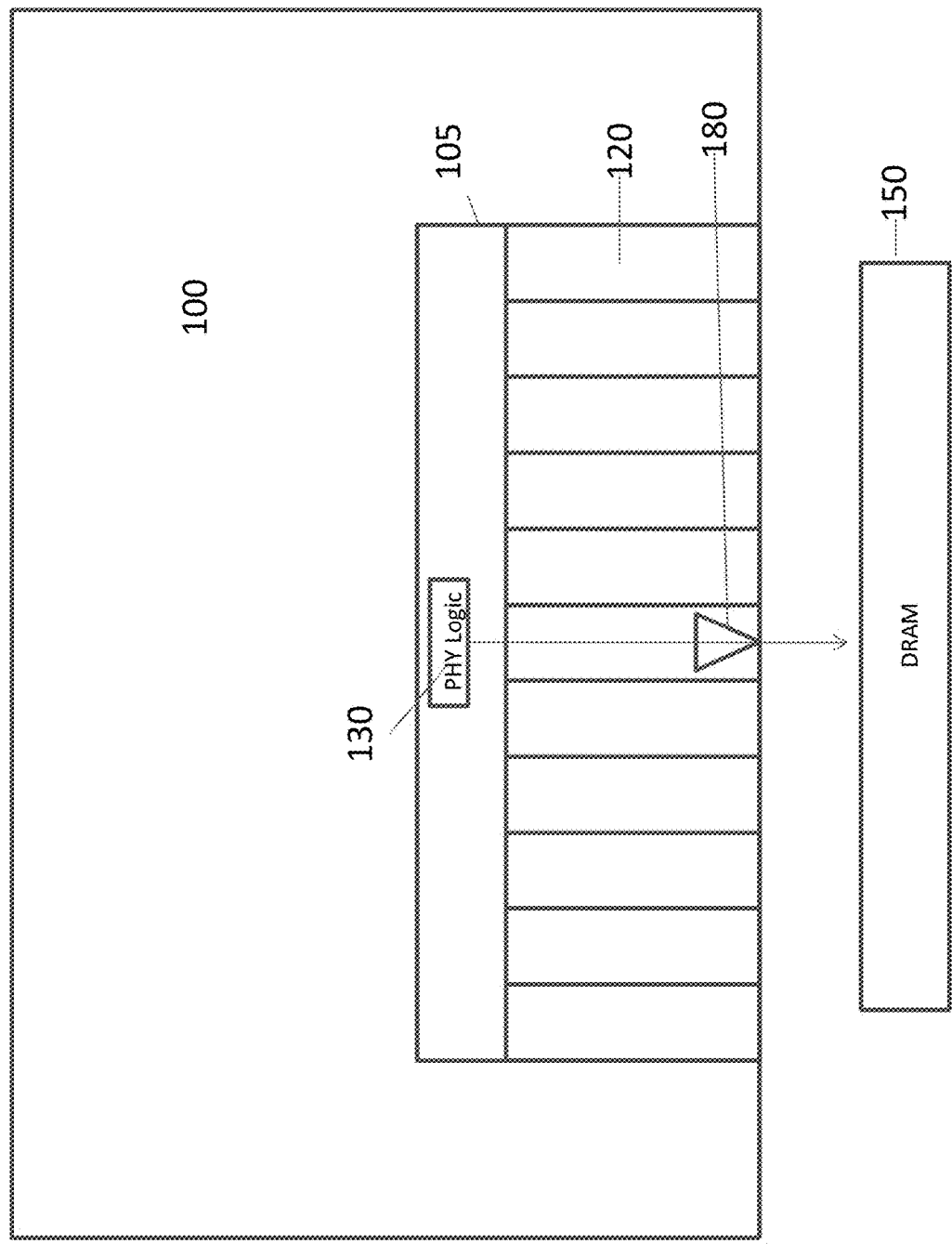
FIG. 1 depicts an example of representative SoC.
Figure 2:
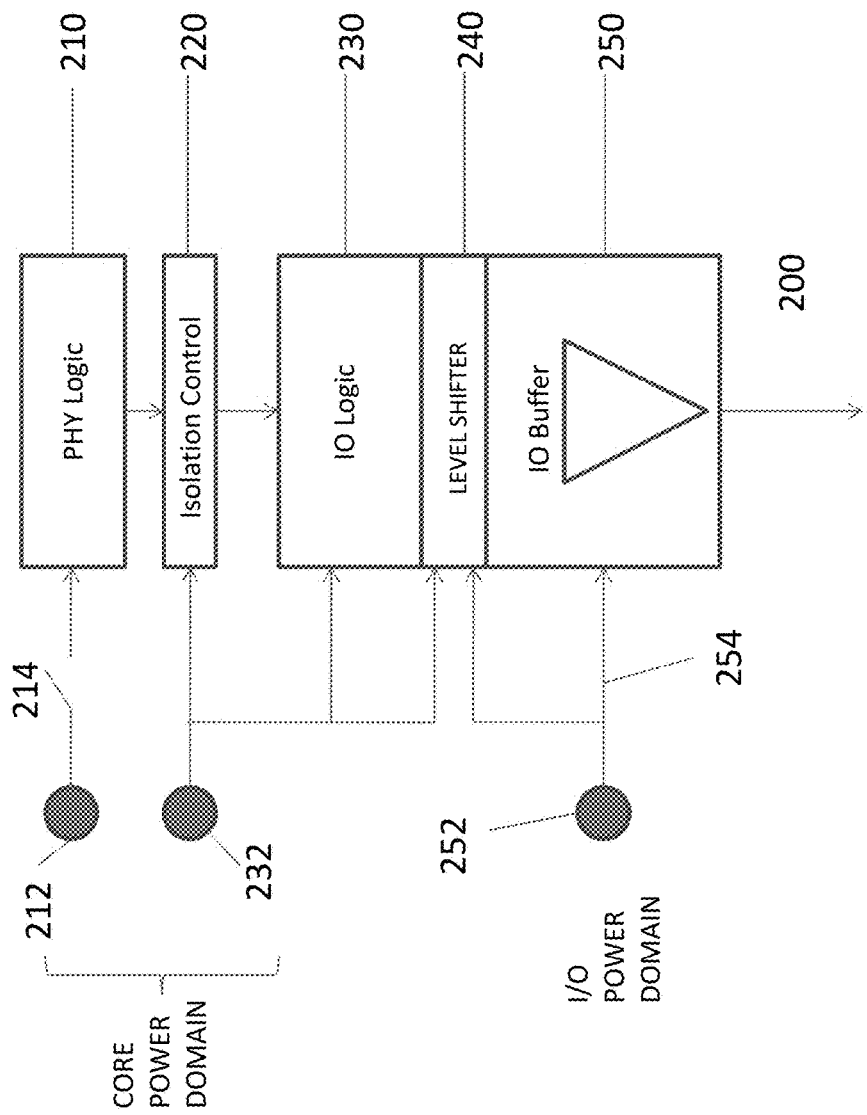
FIG. 2 depicts a representative I/O cell of a SoC having isolation cells proximate to and external from the respective power domains; and, FIG. 3 depicts a representative I/O cell of a SoC in accordance with an embodiment of the present invention.
Figure 3:
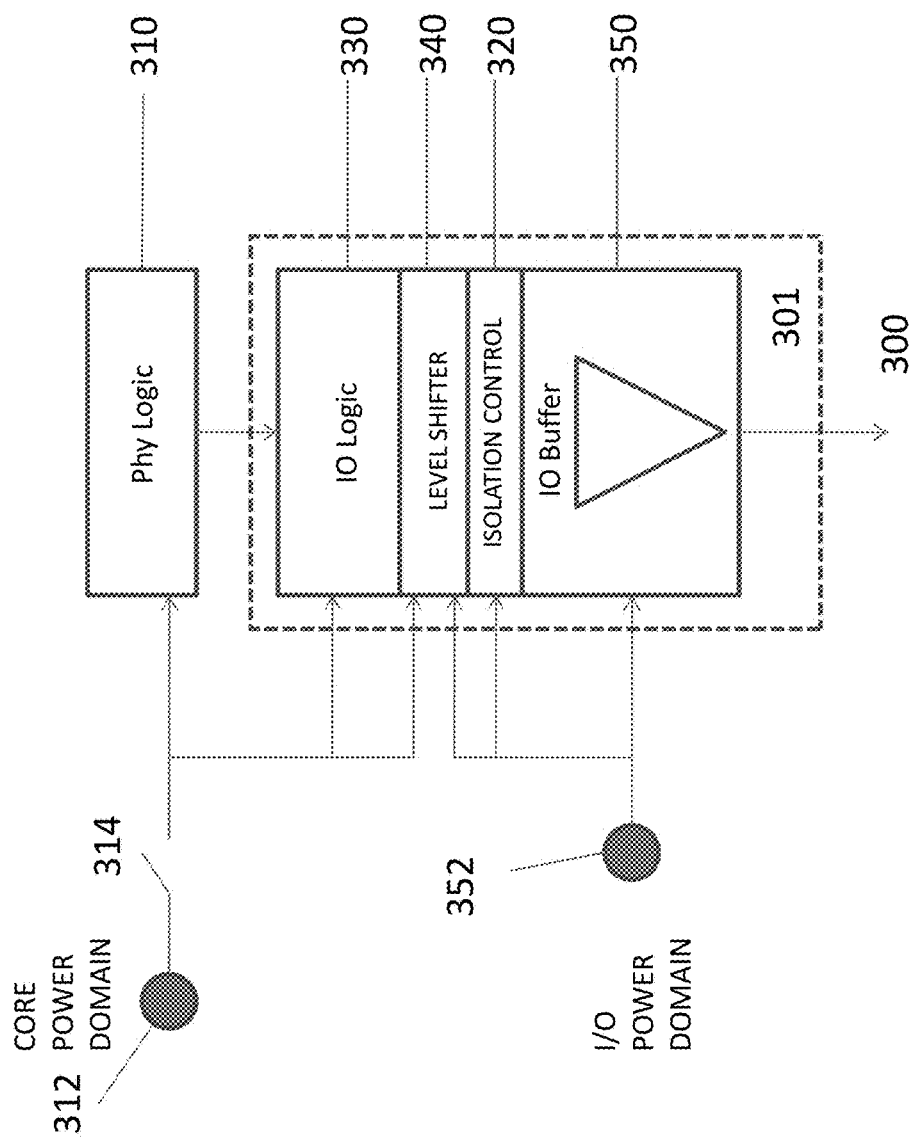

FIG. 3 depicts a circuit 300 having an I/O cell 301 including I/O logic 330 and isolation control 320, each in communication with a level shifter 340, in accordance with an embodiment of the present invention. In FIG. 3, the circuit 300 preferably has an I/O Level power domain 352.

In FIG. 3, a core logic power domain is provided at 312. In an embodiment, the core logic power domain is 0.9 v although it could be any voltage. Power from core logic power domain 312 is provided to the PHY logic 310 where at 314 the power may be disconnected when the device is in shut off or a reduced power mode or similar. The PHY logic 310 is also in communication with I/O logic at 330. Power from the core logic power domain 312 is also available to be provided to I/O logic 330 and the level shifter 340.

From FIG. 3, the I/O logic 330, provides signal to the isolation control 320. The I/O logic drives the I/O buffer 350 through the level shifter and isolation control. In this manner, where the isolation control logic 320 is powered directly the I/O power domain, there is no need for three power domain source points as in prior approaches. Similarly, in this arrangement, the isolation control logic 320 will remain active for coordination with the I/O buffer 350 such that during PSO, for instance, only the I/O power domain source would be required to be active and power consumption can be reduced without impact to reliability or performance. In effect, the isolation control logic 320 is within the I/O level power domain such that in operation, during PSO, only one active power domain is required.

Accordingly, the present invention may be arranged and adapted such that a power domain providing power to an isolation cell is not limited to an I/O Level power domain but may also be a core logic power domain, a protocol power domain, or any other power domain. As is evident from FIG. 3, the present invention in one or more embodiments provides a circuit that only requires a single power domain in operation, thereby improving the operation of PSO. The present invention provides for an alternate arrangement of powering isolation cell(s) over the prior approaches using a single power domain. In operation, in one aspect, power from the I/O power domain 352 may be provided to the I/O cell 300 such that the isolation control 320 and I/O logic 330 are powered even where the core power domain 312 is powered off, such as when a device is in PSO or low power operation.

During PSO, the present invention, in one aspect, controls the isolation cell of the present invention to keep isolation active during PSO utilizing only a single power domain.

Optionally, the present invention in one or more embodiments further comprises a level shifter for shifting power from the power domain to a second power domain or from the second power domain to the power domain. In a further embodiment, the power domain of the circuit comprises a voltage of between 0.5 v and 5.0 v. Optionally, in another aspect, the power domain is an I/O Level power domain or a core logic power domain. Further, in another aspect, the present invention may also include a plurality of controllers, a plurality of isolation cells, and may be a circuit of the type of any of a SoC, processor, chip, NoC, and IC.

Additionally, in a further embodiment, the method of the present invention in one or more aspects further provides for the isolation control logic comprising a plurality of isolation controllers.

Advantageously, the present invention provides for improved PSO capabilities without the complexities suggested by prior approaches, reduces the implication of current leakage issues, and requires only a single power domain for operation. The present invention provides for isolation control logic to be within the I/O power domain in one or more preferred embodiments, such that during PSO, only one active power domain is required.

Accordingly, the reallocation of valuable footprint space where additional electronics and circuitry may be deployed as the logic of traditional designs, along with its associated footprint, may also be a resulting benefit of the present invention.

As used herein, the term power domain is intended to mean a collection of instances that use the same power supply during normal operation and that can be switched on or off at the same time. Typically there are boundary ports associated with a power domain to indicate that the drivers for these ports belong to the same power domain. At the physical level a power domain contains a set of physical gates with a single power and a single ground rail connecting to the same pair of power and ground nets. The power domain also contains a set of special gates such as level shifter cells, state retention cells, isolation cells, power switches, always-on cells, or multi-rail hard macros with multiple power and ground rails. Logically, a power domain corresponds to the physical gates of the power domain and may also have computational or logical elements that correspond with the operation of the domain.

As used herein the terms device, apparatus, system, etc. are intended to be inclusive, interchangeable, and/or synonymous with one another and other similar arrangements and equipment for purposes of the present invention though one will recognize that functionally each may have unique characteristics, functions and/or operations which may be specific to its individual capabilities and/or deployment.

As used herein the term level shifter is inclusive of logic to pass data signals between power domains operating at different voltages.

As used herein the term isolation control is inclusive of logic used to isolate signals between two power domains where one is switched on and one is switched off, where the cell may operate as a buffer when the input and output sides of the cell are both powered up.

As used herein the term SoC or circuit is intended to be used interchangeably and also be further inclusive of any of the IC, chip, Network on Chip (NoC), ASIC, CMOS and similar, without limitation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. An integrated circuit comprising:
  a physical layer (PHY) logic, wherein the PHY logic is powered by a first power domain; and
  at least one input/output (I/O) cell in communication with the PHY logic, wherein the at least one I/O cell houses an I/O logic, an isolation control logic, a level shifter in between the I/O and isolation control logics, and an I/O buffer, wherein the at least one I/O cell is powered by a second power domain when the first power domain is off, and wherein the isolation control logic is in the second power domain and receives power from only the second power domain.

2. The integrated circuit of claim 1, wherein the isolation control logic is in communication with the PHY logic external to the at least one I/O cell, further wherein the second power domain provides power to the isolation control logic and circuitry functions of the at least one I/O cell.

3. The integrated circuit of claim 2, wherein the first power domain is a core logic power domain and the second power domain is an I/O power domain.

4. The integrated circuit of claim 2, wherein the I/O logic is capable of receiving power from both the first and the second power domains.

5. The integrated circuit of claim 1, wherein the first power domain comprises any of a core power domain and a protocol power domain.

6. The integrated circuit of claim 1, wherein the at least one I/O cell comprises a plurality of I/O cells.

7. The integrated circuit of claim 1, wherein the circuit is any of a system on a chip (SoC), processor, chip, network on a chip (NaC), and integrated circuit (IC).

8. The integrated circuit of claim 1, wherein the integrated circuit is in any of a power shut-off operation (PSO) and a low power operation state.

9. The integrated circuit of claim 1, wherein the first power domain is of a voltage between 0.5 v and 5.0 v.

10. A method comprising:
  powering a physical layer (PHY) logic a first power domain, the PHY logic in communication with at least one input/output (I/O) cell, the at least one I/O cell housing an I/O logic, an isolation control logic, a level shifter in between the I/O and isolation control logics, and an I/O buffer; and
  powering the at least one I/O cell by a second power domain when the first power domain is off, such the isolation control logic is in the second power domain and receives power from only the second power domain.

11. The method of claim 10, wherein the isolation control logic is in communication with the PHY logic external to the at least one I/O cell, further wherein the second power domain provides power to the isolation control logic and circuitry functions of the at least one I/O cell.

12. The method of claim 11, wherein the first power domain is a core logic power domain and the second power domain is an I/O power domain.

13. The method of claim 11, wherein the I/O logic is capable of receiving power from both the first and the second power domains.

14. The method of claim 10, wherein the first power domain comprises any of a core power domain and a protocol power domain.

15. The method of claim 10, wherein the at least one I/O cell comprises a plurality of I/O cells.

16. The method of claim 10, wherein an integrated circuit comprises the PHY logic and the at least one I/O cell, and the integrated circuit is any of a system on a chip (SoC), processor, chip, network on a chip (NaC), and integrated circuit (IC).

17. The method of claim 10, wherein an integrated circuit comprises the PHY logic and the at least one I/O cell, and the integrated circuit is in any of a power shut-off operation (PSO) and a low power operation state.

18. The method of claim 10, wherein the first power domain is of a voltage between 0.5 v and 5.0 v.

19. An integrated circuit comprising:
  a physical layer (PHY) logic, wherein the PHY logic is powered by a first power domain; and
  at least one input/output (I/O) cell in communication with the PHY logic, wherein the at least one I/O cell houses an I/O logic, an isolation control logic, a level shifter in between the I/O and isolation control logics, and an I/O buffer, wherein the at least one I/O cell is powered by a second power domain when the first power domain is off, wherein the isolation control logic is in the second power domain, wherein the first power domain is a core logic power domain, and wherein the second power domain is an I/O power domain.

20. The integrated circuit of claim 19, wherein the isolation control logic is in communication with the PHY logic external to the at least one I/O cell, further wherein the second power domain provides power to the isolation control logic and circuitry functions of the at least one I/O cell.

21. The integrated circuit of claim 19, wherein the I/O logic is capable of receiving power from both the first and the second power domains.

* * * * *